United States Patent Office 3,020,162
Patented Feb. 6, 1962

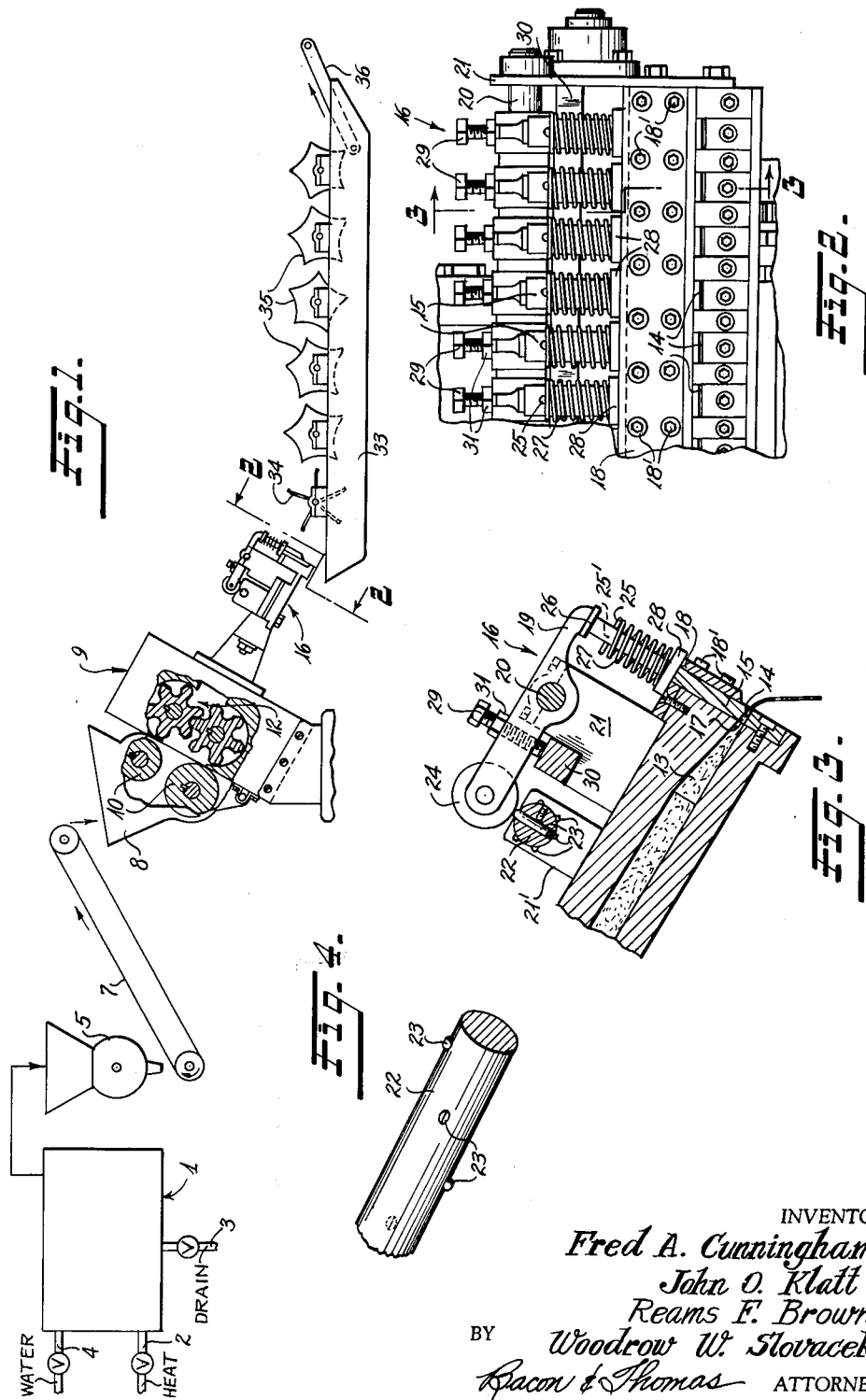

3,020,162
METHOD OF MAKING CORN CHIPS
Fred A. Cunningham, John O. Klatt, Reams F. Brown, and Woodrow W. Slovacek, all of San Antonio, Tex., assignors to The Facs Manufacturing Company, Inc., San Antonio, Tex., a corporation of Texas
Filed Sept. 10, 1957, Ser. No. 683,046
3 Claims. (Cl. 99—80)

The present invention relates in general to the preparation of corn chips and related products and more particularly to a novel process of boiling, grinding, forming and cooking corn. It also relates to a novel corn chip product which may be obtained from this process.

In the past, corn chips and similar products, such as tortillas, have been prepared by a long, costly process including: pre-boiling or steeping the whole corn for twelve hours or more in lime, lye, or some comparable alkaline agent to loosen and break down the kernel hulls; cooling and washing the boiled product to remove the chemical agents employed; and then grinding, extruding and cooking it in a batch-by-batch manner. Many disadvantages are inherent in such a process, including the great amount of time and labor involved and the virtual impossibility of totally removing the lime or other chemical agents employed. Considerable hydrolyzation of the corn occurs and traces of the deleterious agents remain. If these agents are present in any significant quantity, they are not only unhealthful, but also have an undesirable taste. Another important disadvantage lies in the fact that the chemical agents and the steeping action serve to disintegrate the fibrous structure of the hulls, or facilitate their complete removal, giving the final product an unnatural taste and texture. The steeping step also serves to take away a substantial portion of the proteins and minerals with attendant taste and nutritional disadvantages.

It is therefore a primary object of this invention to provide a process for making food products wherein virtually the entire corn kernel is formed into masa.

Another primary object is to provide corn chips which are free of all traces of lime, lye or similar chemical agents, and which contain the ground but substantially undecomposed corn hulls together with the substantially unhydrolyzed starch constituents and almost all of the mineral and protein value of the original kernels.

Another important object is to provide a process for making corn chips wherein a very short time is required, particularly in the steps prior to grinding, and wherein the entire cooking operation is continuous and requires a minimum amount of labor.

Another object is to provide a process for making corn chips wherein the extrusion step is accompanied by a mashing action to eliminate any lumps or unground kernels which may exist in the masa and therefore to prevent clogging of the extrusion die or lack of uniformity in the final product.

Other objects and advantages will be apparent from the following specification taken in conjunction with the accompanying drawings in which:

FIG. 1 is a schematic illustration showing the sequence of steps in the operation;

FIG. 2 is a fragmentary front elevation taken along the lines 2—2 of FIG. 1, and showing an extrusion head which can be employed in the present method.

FIG. 3 is a fragmentary cross-sectional view taken along the lines 3—3 of FIG. 2; and FIG. 4 is a fragmentary perspective view of one element of the apparatus shown in FIG. 3.

In the preferred form of the invention raw corn is boiled for a restricted period of time in water having a substantially neutral pH factor. No attempt is made to loosen or decomposed the corn hulls by steaming under pressure, by chemical treatment, or by extensive steeping or soaking. The hull remains intact and substantially all the protein and mineral content of the raw corn is retained. When rinsed and cooled, the corn is ground into masa with the coarse hull particles interspersed therethrough. The masa in turn is extruded under great pressure into a thin ribbon-like form for deep frying.

Referring now in greater detail to the drawings, and to FIG. 1 in particular, numeral 1 indicates a diagrammatically illustrated vat having a suitable source of heat 2 such as steam, gas, or the like. Whole raw corn kernels are boiled in the vat 1 for a period of time of the order of a half hour. The boiling time will vary depending upon the type of corn employed, its moisture content, etc., but it has been found that a sufficient boiling period is indicated when the whiteness inside the boiled kernel has substantially disappeared, only a small spot of whiteness being visible when the kernel is broken open. At this point, the corn is sufficiently hydrated, and it is important that the boiling is not continued for any substantial period thereafter, as this results in deterioration of the fibrous structure, hydrolyzation of the starch constituents, and loss of valuable minerals and proteins from the corn. At the end of the boiling period the boiling water is drained off, as through a drain 3, and clean, cooler water is admitted, as through pipe 4, to stop the cooking and to clean and cool the corn. The starch products and any other residue boiled out of the corn are thus washed away and the boiled corn is ready to be ground into masa. It will readily be apparent that the means for boiling, cooling and washing may be arranged in any suitable manner, either for performing all three steps automatically and in continuous succession or by batches. However, an important aspect of the present invention is that no chemicals are employed during this pre-cooking of the corn.

Next, the boiled corn is delivered in continuous supply to grinder 5 where it is comminuted to form a loosely agglomerated, sticky masa. The grinder 5 may be of conventional construction as, for example, a millstone-type grinder or the like. Since no excessive boiling or steaming under pressure has been used, and no steeping or chemical treatment occurs, the kernels of boiled corn are complete with the whole undecomposed hull and contain substantially all of the minerals and proteins of the original grain. The kernels are hydrated but no extensive hydrolyzation has occurred. The hull itself is attacked for the first time by the mechanical action of the grinder 5 and the resulting ground undecomposed fibrous matter of the corn hulls forms an important component of the masa.

The masa is delivered as by conveyor 7, to the hopper 8 of an extruder 9 which is disclosed in detail in my co-pending application Serial No. 683,045, filed September 10, 1957. The extruder 9 comprises a pair of delivery rolls 10 situated at the bottom of the hopper 8 and driven by any suitable means (not shown). Masa from the hopper 8 is thus guided by delivery rolls 10 to a gear pump 12. The gear pump 12 serves to knead the masa and to force it under extremely high pressure through a tapering extrusion passage 13 (FIG. 3) to a plurality of die orifices 14. The die orifices 14 are provided in a horizontal row along the front face of an extruder head 16.

Each die orifice 14 is provided with a mashing and cutting element 15 mounted for sliding movement in a substantially vertical direction over the front face of extruder head 16. Elements 15 each have a bevelled lower surface 17 forming the upper edge of the respective orifice 14 and normally lying in generally the same plane as the top of tapering extrusion passage 13. The bevelled lower surfaces may be a quarter of an inch or more in width. Elements 15 are spaced from each other and are maintained in position by a bar 18, which is secured across the front face of the extruder head 16 by means of screws 18' or the like. Each element 15 is adapted to be actuated through the agency of an individual arm 19 pivotally mounted on a shaft 20, which is in turn mounted between supports 21 extending upwardly from the top of the extruder head 16 at either end thereof. A shaft 22, having a plurality of cam elements 23 arranged along its peripheral surface in helically spaced relation as shown in FIG. 4, is journalled in supports 21' and driven by any suitable means (not shown). The rear end of each arm 19 is provided with a wheel 24 and the forward end is provided with a head 26 adapted to engage the top of the respective element 15. As the shaft 22 is rotated, the cam elements 23 successively engage the adjacent wheels 24 causing arms 19 to pivot on shaft 20. Thus, the elements 15 are forced downwardly, closing the orifices 14 in staggered sequence.

Pins 25 are removably mounted through an aperture 25' in the upper portion of each element 15, and are engaged by the upper ends of compression springs 27 positioned around the respective elements 15. The lower ends of the compression springs 27 bear against washers 28 which are positioned on the top of extruder head 16 around each element 15. The normal action of springs 27 thus serves to keep elements 15 in their uppermost position when not actuated.

The aforesaid uppermost position of elements 15 determines the size of die orifices 14 and may be varied by adjustment of bolts 29 which extend vertically through arms 19 rearwardly of the shaft 20 and abut against a transverse bar 30. Bar 30 is rigidly mounted with respect to extruder head 16 between supports 21. Lock nuts 31 may be employed to secure the bolts 29 in their adjusted positions, and thus the pivotal movement of arms 19 and upward travel of elements 15 is positively limited.

Masa extruded through the die orifices 14 emerges in the shape of thin, continuous ribbons, each of which is cut into sections of appropriate length by the intermittent cutting action of the respective elements 15. The bevelled lower surfaces 17 of elements 15, as previously mentioned, are quite wide and have sufficient areas to exert a mashing action on the masa when the elements 15 are actuated. Thus, any lumps or whole kernels which may occur in the masa will not clog the extruder head 16 because they are forced under pressure into the space below the surface 17 and are mashed each time the respective element 15 is actuated. In some instances, it has been found that such a lump or whole kernel may have to be subjected to the mashing action of surface 17 more than once before it is in condition to pass through the die orifice 14. In almost every instance, however, the mashing will be completed in two or three actions and the particular orifice 14 will continue in operation unclogged. This "self-cleaning" action of the elements 15 is extremely effective in handling masa of the instant type where the fibrous structure of the kernel hulls has not been submitted to a decomposing action or has not been ground to the desired consistency.

The extruded masa product emerging from extruder head 16 at an oblique angle falls directly into a cooking vat 33 where it is deep fried in oil. Details of the vat 33 are disclosed in my copending application Serial No. 683,044, dated September 10, 1957, now U.S. Patent No. 2,934,001. The product is conveyed through the cooking vat 33 by circulating the oil through the agency of a paddle member 34 driven by any suitable means (not shown). Since the die orifices 14 are positioned in a horizontal row along the front face of extruder head 16, the masa from each orifice is conveyed laterally therefrom by the current of oil in the vat without interference or overlapping with the masa extruded from the remaining orifices. A plurality of slowly rotating retarder members 35 may be employed, each holding the product temporarily against the current of the circulating oil and thus allowing them to be thoroughly "washed" and permeated by the oil while cooking. Rotating members 35 also serve to dunk successive batches of the masa product below the surface of the cooking liquid at intervals during its course through the vat 33. A conveyor belt 36 can be employed at the opposite end of vat 33 to convey the cooked corn chip product to packaging machines or the like.

The invention will be further illustrated by the following example of practice:

*Example*

A single batch of raw corn weighing a total of 400 pounds and comprising a blend of approximately ¼ white corn to ¾ yellow corn is placed in 200 gallons of water. The water is heated to a temperature of 212° F. and maintained at that temperature for twenty-seven minutes from the time the water boils. At this time the kernels should be hydrated and only a small white spot will remain when one is broken open. The hot water is drained off, in approximately ten minutes, whereupon the vat is refilled with cooler water and drained again. The water supplied for boiling and cooking is normal tap water having a substantial neutral pH factor and being somewhat below room temperature. A total of one hour and fifty minutes elapses during the foregoing steps, and the 400-pound batch of raw corn weighs 600 pounds at the end of these steps. The corn is then immediately fed into the grinder to form masa, which is, in turn, conveyed to the extruder. The extruded product is immersed in a fry vat containing conventional cooking oil at the temperature of 390° F. and passes through the aforedescribed course in the vat, being deep fried for seventy-five seconds. 552 pounds of corn chips are yielded from the 400-pound batch of raw corn.

It will be understood that the proportions, time elements and temperatures in the foregoing example may be varied in a manner which will be readily apparent to those skilled in the art and should not be considered as limiting the invention as defined in the annexed claims.

We claim:

1. A process for forming food products, comprising the steps of: pre-cooking whole kernels of corn in water for a period of time on the order of one-half hour; cooling said whole pre-cooked kernels; grinding said whole pre-cooked kernels to provide corn masa containing the ground undecomposed fibrous hulls; extruding said masa under pressure into a thin body for frying; and subjecting said masa to a continual mechanical mashing action immediately prior to extrusion by compressing said masa between opposed mashing surfaces to eliminate lumps and unground kernels which are too large to be extruded into said thin body.

2. A process for forming food products, comprising the steps of: boiling whole kernels of corn in water for approximately twenty-seven minutes; draining said water from the kernels and subjecting said kernels briefly to water of a lower temperature to cool said kernels; grinding said whole boiled kernels to provide masa; and then delivering said masa under high pressure directly and continuously through an orifice approximately .0025 inch in height to form it into a thin ribbonlike shape, said masa being thereafter fried, said masa being subjected to a continual mechanical mashing action immediately prior to delivery through said orifice by compressing said masa between opposed mashing surfaces to eliminate lumps and unground kernels which are too large to be extruded through said orifice.

3. A process for forming food products, comprising the steps of: pre-cooking whole kernels of corn in water for a period of time on the order of one-half hour, cooling said whole pre-cooked kernels; grinding said whole pre-cooked kernels to provide corn masa containing the ground undecomposed fibrous hulls; extruding said corn masa under pressure into segmented strips said masa being subjected to a continual mechanical mashing action immediately prior to delivery through said orifice by compressing said masa between opposed mashing surfaces to eliminate lumps and unground kernels which are too large to be extruded into said strips; delivering said extruded masa into a body of cooking oil; conveying said extruded masa through said body of cooking oil by circulatory flow of said cooking oil; and intermittently catching and restraining said material against the action of said flow during its course of travel through said body of cooking oil without substantially disrupting the flow of said cooking oil along its normal path.

References Cited in the file of this patent

UNITED STATES PATENTS

| | | |
|---|---|---|
| 1,945,947 | McKay | Feb. 6, 1934 |
| 2,002,053 | Doolin | May 21, 1935 |
| 2,093,260 | Wilder et al. | Sept. 14, 1937 |
| 2,601,823 | McBeth | July 1, 1952 |
| 2,678,599 | Maddocks | May 18, 1954 |
| 2,705,927 | Graves et al. | Apr. 12, 1955 |
| 2,715,869 | Salvo | Aug. 23, 1955 |
| 2,916,378 | Kunce et al. | Dec. 8, 1959 |

FOREIGN PATENTS

| | | |
|---|---|---|
| 298 | Great Britain | 1876 |
| 496 | Great Britain | 1906 |

OTHER REFERENCES

Food Engineering vol. 23, No. 4 (April 1951), pp. 154–157 (photocopy in 99–80).

"Rice Curls—a New Food Product From Rice," by Roberts et al., United States Dept. of Agriculture, Agricultural Research Adm., Bureau of Agricultural and Industrial Chemistry, Wash. 25, D.C.; AIC–258, February 1950, pp. 2–5 relied on.